United States Patent
Ebisawa et al.

(10) Patent No.: US 6,340,529 B1
(45) Date of Patent: Jan. 22, 2002

(54) GLAZING PANEL

(75) Inventors: Junichi Ebisawa; Nobutaka Aomine; Satoshi Takeda; Kazuyoshi Noda, all of Kanagawa (JP); Daniel Decroupet, Jumet (BE)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/466,785

(22) Filed: Dec. 20, 1999

(30) Foreign Application Priority Data

Dec. 18, 1998 (EP) .............................. 98204319

(51) Int. Cl.$^7$ .............................. B32B 17/06
(52) U.S. Cl. ............ 428/432; 428/426; 428/698; 428/472; 428/701; 359/359; 359/585
(58) Field of Search ................. 428/432, 433, 428/434, 469, 698, 426, 472, 701; 359/359, 585

(56) References Cited

U.S. PATENT DOCUMENTS

| | | | |
|---|---|---|---|
| 4,462,883 A | 7/1984 | Hart | |
| 4,716,086 A | 12/1987 | Gillery et al. | |
| 4,786,563 A | 11/1988 | Gillery et al. | |
| 4,806,220 A | 2/1989 | Finley | |
| 4,822,120 A | 4/1989 | Fan et al. | |
| 4,834,857 A | 5/1989 | Gillery | |
| 4,859,532 A | 8/1989 | Oyama et al. | |
| 4,894,290 A | * 1/1990 | Chesworth et al. | |
| 4,898,789 A | 2/1990 | Finley | |
| 4,898,790 A | 2/1990 | Finley | |
| 4,902,580 A | 2/1990 | Gillery | |
| 4,943,484 A | 7/1990 | Goodman | |
| 5,271,994 A | 12/1993 | Termath | |
| 5,413,864 A | 5/1995 | Miyazaki et al. | |
| 5,532,062 A | 7/1996 | Miyazaki et al. | |
| 5,543,229 A | 8/1996 | Ohsaki et al. | |
| 5,563,734 A | * 10/1996 | Wolfe et al. | |
| 5,763,064 A | 6/1998 | Suzuki et al. | |
| 5,834,103 A | 11/1998 | Bond et al. | |
| 5,837,361 A | 11/1998 | Glaser et al. | |
| 5,873,361 A | * 11/1998 | Glaser et al. | |
| 5,935,702 A | * 8/1999 | Macquart et al. | |
| 5,965,246 A | * 10/1999 | Guiselin et al. | |
| 5,993,617 A | 11/1999 | Ando et al. | |
| 5,993,950 A | * 11/1999 | Novis et al. | |
| 6,040,939 A | * 3/2000 | Demiryont et al. | |

FOREIGN PATENT DOCUMENTS

| | | |
|---|---|---|
| DE | 19732978 C1 | * 11/1998 |
| EP | 0 233 003 | 8/1987 |
| EP | 0 464 789 | 1/1992 |
| EP | 0636 587 | 2/1995 |
| EP | 0 718 250 | 6/1996 |
| EP | 0 751 099 | 1/1997 |
| EP | 0 747 330 | 12/1997 |

* cited by examiner

*Primary Examiner*—Deborah Jones
*Assistant Examiner*—Jennifer McNeil
(74) *Attorney, Agent, or Firm*—Oblon, Spivak, McClelland, Maier & Neustadt, P.C.

(57) ABSTRACT

A glazing panel carrying a solar control coating stack comprising in sequence at least:

Figure 1:
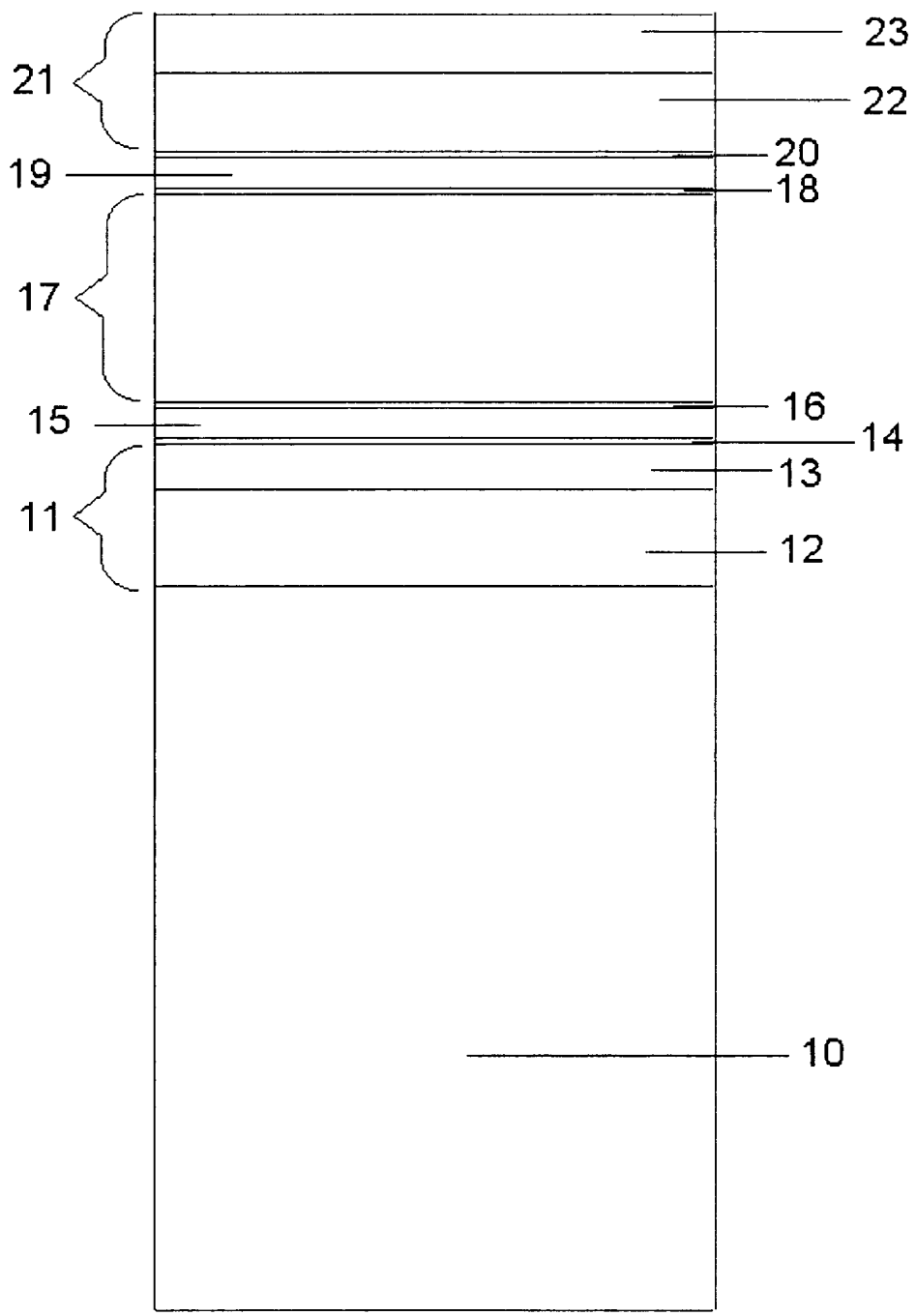

a glass substrate;

a base antireflective layer comprises at least one layer comprising a nitride of aluminum an infra-red reflecting layer; and a top antireflective layer.

The nitride of aluminum confers, inter alia, good thermal stability on the coating, particularly during heat treatment.

66 Claims, 1 Drawing Sheet

GLAZING PANEL

BACKGROUND OF THE INVENTION

1. Field of the Invention

This invention relates to glazing panels and particularly, but not exclusively, to solar control glazing panels which are intended to undergo heat treatment following application of a solar control filter.

2. Discussion of Background

EP 233003A describes a glazing panel carrying a sputter coated optical filter having the structure: glass substrate/ $SnO_2$ base dielectric/first metallic barrier of Al, Ti, Zn, Zr or Ta/Ag/second metallic barrier of Al, Ti, Zn, Zr or Ta/$SnO_2$ top dielectric. The optical filter is designed to block a significant portion of the incident radiation in the infra red portion of the spectrum whilst allowing passage of a significant portion of the incident radiation in the visible portion of the spectrum. In this way, the filter acts to reduce the heating effect of incident sunlight whilst allowing good visibility through the glazing and is particularly suitable for car windscreens.

In this type of structure, the Ag layer acts to reflect incident infra red radiation and in order to fulfill this role must be maintained as silver metal rather than silver oxide and must not be contaminated by adjacent layers. The dielectric layers which sandwich the Ag layer serve to reduce the reflection of the visible portion of the spectrum which the Ag layer would otherwise provoke. The second barrier serves to prevent oxidation of the Ag layer during sputtering of the overlying $SnO_2$ dielectric layer in an oxidising atmosphere; this barrier is at least partially oxidised during this process. The main role of the first barrier is to prevent oxidation of the silver layer during heat treatment of the coating (e.g. during bending and/or tempering) of the glazing panel by being oxidised itself rather than allowing passage of oxygen to the Ag layer. This oxidation of the barrier during heat treatment provokes an increase in $T_L$ of the glazing panel.

EP 792847A discloses a heat treatable solar control glazing panel which is based on the same principle and has the structure: glass substrate/ZnO dielectric/Zn barrier/Ag/Zn barrier/ZnO dielectric/Zn barrier/Ag/Zn barrier/ZnO dielectric. The Zn barriers positioned below each of the Ag layers are intended to be oxidised completely during heat treatment and serve to protect the Ag layers from oxidation. As well known in the art, the structure of having two, spaced Ag layers rather than a single layer Ag layer increases the selectivity of the filter.

EP 718250A discloses the use of a layer which provides a barrier to oxygen diffusion as at least part of the outermost dielectric layer in this type of filter stack. Such a layer must have a thickness of at least 100 Å and preferably at least 200 Å in order to form an effective barrier and may comprise a silicon compound $SiO_2$, $SiO_xC_y$, $SiO_xN_y$, nitrides like $Si_3N_4$ or AlN, carbides like SiC, TiC, CrC and TaC.

The antireflective layer is a layer composed of at least one member selected from the group consisting of oxides, nitrides and carbides and double compounds thereof.

As the oxide, for example, an oxide of at least one element selected from the group consisting of Zn, Ti, Sn, Si, Al, Ta or Zr may be mentioned. In addition, for example, zinc oxide containing Al, Ga, Si or Sn or indium oxide containing Sn may be mentioned.

As the nitride, a nitride of at least one element selected from the group consisting of Si, Al and B (a nitride (A)) or a mixture (inclusive of a double nitride) of a nitride of Zr or Ti with a nitride (A) may be mentioned.

As the double compound, $SiO_xC_y$, $SiO_xN_y$, $SiAl_xN_y$ or $SiAl_xO_yN_z$ may be mentioned. The antireflective layer may be a single layer or a multiple layer.

Especially, a zinc oxide or a zinc oxide containing at least one element selected from the group consisting of Sn, Al, Cr, Ti, Si, B, Mg, In and Ga is preferable, because it makes it possible to stably form an adjacent infra-red reflecting layer with a high crystallinity. Especially, a zinc oxide containing Al and/or Ti is preferable.

The infra-red reflecting material is a material that has a reflectance higher than the reflectance of sodalime glass in the band of wavelength between 780 nm and 50 $\mu$m.

The infra-red reflecting layer is a layer composed of Ag only or a layer comprising Ag as the main component and an additional metal element (such as Pd, Au or Cu). When an additional metal element is contained, the content of the additional metal element is preferably from 0.3 to 10 at %, more preferably from 0.3 to 5 at %, based on the total of Ag and the additional metal element. If the content of an additional metal element is less than 0.3 at %, the effect of stabilizing Ag is small. Also, if the content of an additional metal element exceeds 10 at %, the effect of stabilizing Ag diminishes. Especially, Pd as the additional metal element can immobilize Ag atoms, namely depress the migration of Ag atoms and affords a layer which is excellent in stability and chemical resistance at high temperatures. As the Pd content increases, the rate of film formation tends to decrease, the visible light transmittance tends to lower, and the shielding selectivity between visible rays and near infrared rays tends to become poor. Therefore, the Pd content is preferred to be at most 5.0 at %, especially from 0.3 to 2.0 at %.

When the glass laminate of the present invention comprises more than one infra-red reflecting layer, each infra-red reflecting layer may have the same composition or a different composition. The infra-red reflecting layer may be a multiple layer comprising at least two laminated films, for example, a multiple layer composed of Ag and Pd.

In a glazing panel having a three layer type laminated coating, the thicknesses of the base antireflective layer, the infra-red layer and the top antireflective layer layer are preferably from 15 to 45 nm, from 9 to 16 nm (especially from 9 to 12 nm) and from 30 to 45 nm, respectively. A glazing panel comprising a colorless soda lime glass substrate of 2 mm thick and a three layer type laminated coating formed on the substrate has such representative optical properties as a luminous transmittance (TL) of about from 75 to 85% and an energetic transmittance (TE) of about from 50 to 70% after heat treatment.

In a glazing panel having a five layer type laminated coating, the thicknesses of the base antireflective layer, the infra-red layer the central antireflective layer, the infra-red layer and the top antireflective layer layer are preferably from 16 to 50 nm (especially from 20 to 45 nm), from 6.5 to 16 nm (especially from 6.5 to 12.5 nm), from 40 to 100 nm (especially from 45 to 90 nm), from 6.5 to 16 nm (especially from 6.5 to 12.5 nm) and from 16 to 50 nm (especially from 20 to 45 nm), respectively. A glazing panel comprising a colorless soda lime glass substrate of 2 mm thick and a five layer type laminated coating formed on the substrate has such representative optical properties as a luminous transmittance (TL) of about from 70 to 80% and an energetic transmittance (TE) of about from 40 to 50% after heat treatment.

DETAILED DESCRIPTION OF THE INVENTION

The term "heat treatable glazing panel" as used herein means that the glazing panel carrying the coating stack is adapted to undergo a bending and/or thermal tempering and/or thermal hardening operation and/or other heat treatment process without the haze of the so treated glazing panel exceeding 0.5, and preferably without the haze exceeding 0.3. The term "substantially haze free heat treated glazing panel" as used herein means a glazing panel carrying a coating stack which has been bent and/or thermally tempered and/or thermally hardened and has a haze that does not exceed 0.5 and which preferably does not exceed 0.3. In the present invention, a glazing panel can be subjected to heat treatment for 1) bending, 2) tempering, 3) sintering of colored ceramic print or silver bus bar print, 4) vacuum sealing of vacuum double glazing and 5) calcination of a wet-coated low reflective coating or antiglare coating. For example, it is heated to a temperature of from 570 to 700° C. in the atmosphere for 1) bending or 2) tempering. The bending and/or thermal tempering and/or thermal hardening operation may be carried out at a temperature of at least, 600° C. for at least 10 minutes, 12 minutes, or 15 minutes, at least 620° C. for at least 10 minutes, 12 minutes, or 15 minutes, or at least 640° C. for at least 10 minutes, 12 minutes, or 15 minutes.

Any suitable method or combination of methods may be used to deposit the coating layers. For example, evaporation (thermal or electron beam), liquid pyrolysis, chemical vapour deposition, vacuum deposition and sputtering, particularly magnetron sputtering, the latter being particularly preferred. Different layers of the coating stack may be deposited using different techniques.

The nitride of aluminum may be pure AlN, substantially pure AlN, AN containing impurities or AlN containing one or more dopants, for example, chromium and/or silicon and/or titanium, which may improve chemical durability of the material. The nitride of aluminum may contain about 97% pure AN by weight. Alternatively, it may contain an oxynitride, a carbonitride or an oxycarbonitride. The nitride of aluminum may be deposited by sputtering a target in a nitrogen atmosphere. Alternatively, it may be deposited by sputtering a target in an atmosphere which is a mixture of argon and nitrogen.

The target may be 6061 alloy, 6066 alloy, 4032 alloy, etc.

A nitride of aluminum in the base antireflective layer is believed effective in blocking not only oxygen but also sodium ions and other ions that can diffuse from the glass into the coating stack and cause a deterioration of optical and electrical properties, particularly if the glazing panel is subjected to heat treatment.

$SiO_2$ and $Al_2O_3$ are known to be effective barriers to diffusion of sodium ions in sputtered coating stacks. In addition to being easier, quicker and more cost effective to deposit by sputtering, it is believed that a nitride of aluminum as part of the base dielectric layer provides an effective barrier to both sodium ions and oxygen diffusion. Furthermore, it is believed that a nitride of aluminum may provide an effective diffusion barrier at smaller geometrical thicknesses than that required using known materials. For example, good thermal resistance with respect to ion and oxygen diffusion from the glass substrate may be conferred on the coating stack by arranging a nitride of aluminum having a geometrical thickness of greater than 40 Å, for example, about 50 Å as at least part of the base antireflective layer particularly if the coating stack also includes a barrier layer, for example a metal or sub-oxide barrier layer, underlying the infra-red reflecting layer. In the absence of such a barrier layer underlying the infra-red reflecting layer, good thermal resistance with respect to ion and oxygen diffusion from the glass substrate may be conferred on the coating stack by arranging a nitride of aluminum having a geometrical thickness of greater than 50 Å, preferably greater than 80 Å or 90 Å, for example, about 100 Å as at least part of the base antireflective layer. A layer of a nitride of aluminum may confer advantageous properties even if it is less than 195 Å thick.

The coating stack may comprise a barrier layer overlying the infra red reflecting layer and/or a barrier layer underlying the infra red reflecting layer. Such barriers may contain one or more metals and may be deposited, for example, as metal oxides, as metal sub-oxides or as metals.

Further, in the invention, when a layer composed of an oxide or a double compound containing an oxide such as an oxynitride is formed as an antireflective layer by reactive sputtering in an atmosphere containing an oxidative gas, formation of such antireflective layer directly on the infra-red reflecting layer can fail to give a glazing panel having desired optical and electrical properties because of oxidation of the infra-red reflecting layer Therefore, it is preferred to form a metal or nitride barrier layer. Such a barrier layer usually stays in a partly oxidized state, and during heat treatment, oxidizes into a transparent oxide having a higher visible light transmittance.

As the barrier layer, a metal of at least one element selected from the group consisting of Ti, Zn, Al—Zn, Ti—Zn, SUS, Zr, Ta, NiCr, Ni, Ni—Ti, a nitride of at least one element selected from the group consisting of Ti, Zn, Al—Zn, Ti—Zn, SUS, Zr, Ta, NiCr, Ni, Ni—Ti, and a sub-oxide (i.e. partially oxized) of at least one element selected from the group consisting of Ti, Zn, Al—Zn, Ti—Zn, SUS, Zr, Ta, NiCr, Ni, Ni—Ti is preferable. The thickness of a barrier layer is preferably from 1 to 5 nm. A barrier layer thinner than 1 nm does not work well, while a barrier layer thicker than 5 nm can lower the visible light transmittance of the glass laminate or cause other problems.

When an oxide layer, for example, composed of zinc oxide containing Al is formed directly on the infra-red reflecting layer as the antireflective layer, an Al—Zn alloy barrier layer having the same metal ratio can strengthen the adhesion between the infra-red reflecting layer and the antireflective layer and thus is effective in improving durability of the layers of the multilayer structure. An Al—Zn alloy barrier layer is also preferable in view of the crystallinity of Ag in the infra-red reflecting layer and the heat resistance. A barrier layer may be formed under the infra-red reflecting layer, too.

The ability to block ion and oxygen diffusion from the glass substrate with a relatively thin layer provides great flexibility in the materials and thickness that may be used for the other layers in the coating stack.

Providing a layer of a metal oxide between the nitride of aluminum and the infra-red reflecting material (particularly when this is silver or a silver alloy) may combine the thermal stability properties of the nitride of aluminum with an interposed material which favours crystallisation of the infra-red reflecting material so as to balance the infra red reflecting properties with the haze of the coating stack, particularly when it is subjected to heat treatment. One preferred such oxide is a mixed oxide of zinc and aluminum, preferably with a Al/Zn atomic ratio of about 0.1–0.2, especially 0.1–0.15. One possible explanation for this may be that the presence of the Al in the zinc oxide structure may reduce the crystal grain growth in the mixed oxide layer.

The effectiveness of a relatively thin layer of the nitride of aluminum in conferring thermal stability allows use of a relatively thick layer of such an oxide.

Both $Si_3N_4$ and AlN take longer to deposit by common sputtering techniques than oxides traditionally used in such coatings e.g. ZnO, SnO$_2$. The ability to provide good thermal stability with a relatively thin layer of a nitride of aluminum thus alleviates the deposition of such a layer as a limiting factor in a deposition process.

A nitride of aluminum is also more cost effective to deposit by sputtering than, for example, Si$_3$N$_4$ and does not require the doping or control precautions required for depositing Si$_3$N$_4$.

The optical thickness of the antireflective layers and particularly that of the top antireflective layer is critical in determining the colour of the glazing panel. If a portion of an antireflective layer is oxidised, for example during heat treatment of the glazing panel then, particularly with Si$_3$N$_4$ (refractive index about 2) the optical thickness can be modified as Si$_3$N$_4$ may be oxidised to SiO$_2$ (refractive index about 1.45). Where the antireflective layer comprises a nitride of aluminum having a refractive index of about 2.0, oxidation of a part of this to Al$_2$O$_3$ (refractive index about 1.7) will have negligible effect upon the optical thickness of the layer.

The ability to use a layer of a nitride of aluminum which is less than 100 Å in thickness to provide an effective thermal barrier provides significant flexibility in the choice of the overall structure of the top antireflective layer. The layer comprising a nitride of aluminum may be about 85 Å in thickness; this provides a compromise between good thermal resistance and thickness. The layer comprising a nitride of aluminum may have a geometrical thickness of greater than or equal to about 50 Å, 60 Å or 80 Å; its thickness may be less than or equal to about 85 Å, 90 Å or 95 Å.

Heat treatment may provoke an increase in the TL of the glazing panel. Such an increase in TL may be advantageous in ensuring that TL is sufficiently high for the glazing panel to be used in a vehicle windscreen. TL may increase in absolute terms during heat treatment by, for example, greater than about 2.5%, greater than about 3%, greater than about 5%, greater than about 8% or greater than about 10%.

According to a further aspect, the present invention provides a method of manufacturing a glazing panel as defined in claim 13. This provides a heat treated glazing panel having a haze of less than about 0.5 and preferably less than about 0.3 suitable for use, for example, in architectural, vehicle and industrial applications.

Examples of the present invention will now be described with reference to FIG. 1 which is a cross-section through a glazing panel prior to a bending and tempering operation (for ease of representation, the relative thicknesses of the glazing panel and coating layers are not shown to scale).

EXAMPLE 1

FIG. 1 shows a double Ag layer, heat treatable, coating layer deposited on a glass substrate by magnetron sputtering and having the following sequential structure:

| | Reference number | Geometrical thickness | Atomic ratios |
|---|---|---|---|
| Glass substrate | 10 | 2 mm | |
| Base dielectric comprising | 11 | | |
| AlN | 12 | 60 Å | |
| ZnAlOx | 13 | 250 Å | Al/Zn = 0.1 |
| ZnAlOy underlying barrier | 14 | 10 Å | Al/Zn = 0.1 |
| Ag | 15 | 100 Å | |
| ZnAlOy overlying barrier | 16 | 12 Å | Al/Zn = 0.1 |

-continued

| | Reference number | Geometrical thickness | Atomic ratios |
|---|---|---|---|
| Central dielectric comprising ZnAlOx | 17 | 750 Å | Al/Zn = 0.1 |
| ZnAlOy underlying barrier | 18 | 7 Å | Al/Zn = 0.1 |
| Ag | 19 | 100 Å | |
| ZnAlOy overlying barrier | 20 | 17 Å | Al/Zn = 0.1 |
| Top dielectric comprising | | | |
| ZnAlOx | 22 | 185 Å | Al/Zn = 0.1 |
| AlN | 23 | 85 Å | | in which ZnAlO$_x$ is a mixed oxide containing Zn and Al deposited in this example by reactively sputtering a target which is an alloy or mixture of Zn and Al in the presence of oxygen. The ZnAlO$_y$ barriers are similarly deposited by sputtering a target which is an alloy or mixture of Zn and Al in an argon rich oxygen containing atmosphere to deposit a barrier that is not fully oxidised.

Alternatively, the mixed oxide layer ZnAlO$_x$ may be formed by sputtering a target which is a mixture of zinc oxide and an oxide of Al, particularly in an argon gas or argon rich oxygen containing atmosphere.

Where the barrier layers comprise the same materials as the mixed oxide layer, particularly the adjacent mixed oxide layer, this may facilitate management of targets and control of deposition conditions and may provide good adhesion between the layers and thus good mechanical durability of the coating stack.

The oxidation state in each of the base, central and top ZnAlO$_x$ dielectric layers need not necessarily be the same. Similarly, the oxidation state in each of the ZnAlO$_y$ barriers need not be the same. Equally, the Al/Zn ratio need not be the same for all of the layers; for example, the barrier layers may have a different Al/Zn ratio to the antireflective dielectric layers and the antireflective dielectric layers may have different Al/Zn ratios from each other.

Each overlying barrier protects its underlying silver layer from oxidation during sputter deposition of its overlying ZnAlO$_x$ oxide layer. Whilst further oxidation of these barrier layers may occur during deposition of their overlying oxide layers a portion of these barriers preferably remains in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment see Note 1 below | Following heat treatment see Note 2 below |
|---|---|---|
| TL (Illuminant A) | 63% | 76% |
| TE (System Moon 2) | 38% | 42% |
| haze | 0.1 | 0.25 |
| a* | −20 (coated side) | −6 (external) |
| b* | +3 (coated side) | −12 (external) |
| RE (System Moon 2) | 31% (coated side) | 33% (external) |

Note 1: Measured for monolithic glazing panel with coating prior to heat treatment
Note 2: Measured following heat treatment at 650° C. for 10 minutes followed by bending and tempering, and lamination with clear 2 mm glass sheet and 0.76 mm clear pvb Heat treatment preferably causes substantially complete oxidation of all of the barrier layers such that the structure of the coating stack after heat treatment is:

| | Reference number | Geometrical thickness | Atomic ratios |
|---|---|---|---|
| Glass substrate | 10 | 2 mm | |
| Base dielectric comprising | 11 | | |
| AlN (partially oxidised) | 12 | 60 Å | |
| ZnAlOx | 13 | 250 Å | Al/Zn = 0.1 |
| ZnAlOx (oxidised underlying barrier) | 14 | 10 Å–16 Å | Al/Zn = 0.1 |
| Ag | 15 | 100 Å | |
| ZnAlOx (oxidised overlying barrier) | 16 | 12 Å–20 Å | Al/Zn = 0.1 |
| Central dielectric comprising ZnAlOx | 17 | 750 Å | Al/Zn = 0.1 |
| ZnAlOx (oxidised underlying barrier) | 18 | 7 Å–12 Å | Al/Zn = 0.1 |
| Ag | 19 | 100 Å | |
| ZnAlOx (oxidised overlying barrier) | 20 | 17 Å–28 Å | Al/Zn = 0.1 |
| Top dielectric comprising | | | |
| ZnAlOx | 22 | 185 Å | Al/Zn = 0.1 |
| AlN (partially oxidised) | 23 | 85 Å | |

The AlN (partially oxidised) layers may comprise a mixture of AlN and $Al_2O_3$, the AlN being partially oxidised during the heat treatment process. The barrier layers are not necessarily completely oxidised and their thickness will depend to a certain extent upon their degree of oxidation.

EXAMPLE 2

Example 2 is similar to Example 1, save that the underlying barriers of the coating stack were omitted. The coating stacks and properties of the Example are set out below:

| | Reference number | Geometrical thickness | Atomic ratios |
|---|---|---|---|
| Glass substrate | 10 | 2 mm | |
| Base dielectric comprising | 11 | | |
| AlN | 12 | 100 Å | |
| ZnAlOx | 13 | 200 Å | Al/Zn = 0.1 |
| Ag | 15 | 100 Å | |
| ZnAl overlying barrier | 16 | 10 Å | Al/Zn = 0.1 |
| Central dielectric comprising ZnAlOx | 17 | 750 Å | Al/Zn = 0.1 |
| Ag | 19 | 100 Å | |
| ZnAl overlying barrier | 20 | 15 Å | Al/Zn = 0.1 |
| Top dielectric comprising | | | |
| ZnAlOx | 22 | 185 Å | Al/Zn = 0.1 |
| AlN | 23 | 85 Å | | in which $ZnAlO_x$ is a mixed oxide containing Zn and Al deposited in this example by reactively sputtering a target which is an alloy or mixture of Zn and Al in the presence of oxygen. The ZnAl barriers are similarly deposited by sputtering a target which is an alloy or mixture of Zn and Al in a substantially inert, oxygen free atmosphere.

At least a portion of the overlying barriers 16, 20 is oxidised during deposition of their overlying oxide layers. Nevertheless, a portion of these barriers preferably remains in metallic form, or at least in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment see Note 1 below | Following heat treatment see Note 2 below |
|---|---|---|
| TL (Illuminant A) | 70% | 77% |
| TE (System Moon 2) | 41% | 43% |
| haze | 0.1 | 0.2 |
| a* | −17 (coated side) | −5 (external) |
| b* | +8 (coated side) | −9 (external) |
| RE (System Moon 2) | 33% (coated side) | 34% (external) |

Note 1: Measured for monolithic glazing panel with coating prior to heat treatment
Note 2: Measured following heat treatment at 625° C. for 14 minutes followed by bending and tempering, and lamination with clear 2 mm glass sheet and 0.76 mm clear pvb Heat treatment preferably causes substantially complete oxidation of all of the barrier layers such that the structure of the coating stack after heat treatment is:

Coating Stack Following Heat Treatment

| | Reference number | Geometrical thickness | Atomic ratios |
|---|---|---|---|
| Glass substrate | 10 | 2 mm | |
| Base dielectric comprising | 11 | | |
| AlN (partially oxidised) | 12 | 100 Å | |
| ZnAlOx | 13 | 200 Å | Al/Zn = 0.1 |
| Ag | 15 | 100 Å | |
| ZnAlOx (oxidised overlying barrier) | 16 | 12–20 Å | Al/Zn = 0.1 |
| Central dielectric comprising ZnAlOx | 17 | 750 Å | Al/Zn = 0.1 |
| Ag | 19 | 100 Å | |
| ZnAlOx (oxidised overlying barrier) | 20 | 17–30 Å | Al/Zn = 0.1 |
| Top dielectric comprising | | | |
| ZnAlOx | 22 | 185 Å | Al/Zn = 0.1 |
| AlN (partially oxidised) | 23 | 85 Å | |

Additional layers may be introduced above, below or between the film stacking arrangement if desired without departing from the invention.

In addition to the advantageous optical properties that may be obtained, each of the examples provides a coating layer which may be electrically heated, for example, in an electrically heated car windscreen to provide a de-misting and/or defrosting function with the addition of suitably placed electrical connectors.

The colour co-ordinates of the examples are particularly suited to car windscreens as they give a neutral or slightly blue or slightly green appearance in reflection when the windscreen is mounted at an angle in the car body. For other applications, for example architectural applications, the colour in reflection may be adjusted as is known in the art by adjusting the thicknesses of the dielectric layers and/or silver layer(s).

EXAMPLE 3

Example 3 is similar to Example 2. The coating stacks and properties of the Example are set out below:

| | Reference number | Geometrical thickness | Atomic ratios |
|---|---|---|---|
| Glass substrate | 10 | 2 mm | |
| Base dielectric comprising | 11 | | |
| AlNx | 12 | 110 Å | |
| ZnAlOx | 13 | 240 Å | Al/Zn = 0.14 |
| Ag | 15 | 100 Å | |
| ZnAl overlying barrier | 16 | 12 Å | Al/Zn = 0.14 |
| Central dielectric comprising ZnAlOx | 17 | 750 Å | Al/Zn = 0.14 |
| Ag | 19 | 100 Å | |
| ZnAlOx overlying barrier | 20 | 18 Å | Al/Zn = 0.14 |
| Top dielectric comprising | | | |
| ZnAlOx | 22 | 180 Å | Al/Zn = 0.14 |
| AlNx | 23 | 85 Å | |

At least a portion of the overlying barriers 16, 20 is oxidised during deposition of their overlying oxide layers. Nevertheless, a portion of these barriers preferably remains in metallic form, or at least in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment see Note 1 below | Following heat treatment see Note 2 below |
|---|---|---|
| TL (Illuminant A) | — | 76% |
| TE (System Moon 2) | — | 43% |
| haze | — | 0.23% |
| a* | −10 (coated side) | — |
| b* | — | — |
| RE (System Moon 2) | — | 32% (external) |

Note 1: Measured for monolithic glazing panel with coating prior to heat treatment
Note 2: Measured following heat treatment at 625° C. for 14 minutes with bending and tempering, and lamination with clear 2 mm glass sheet and 0.76 mm clear pvb

EXAMPLES 4

Example 4 is similar to Example 2. The coating stacks and properties of the Example are set out below:

| | Reference number | Geometrical thickness | Atomic ratios |
|---|---|---|---|
| Glass substrate | 10 | 2 mm | |
| Base dielectric comprising | 11 | | |
| AlNx | 12 | 100 Å | |
| ZnAlOx | 13 | 220 Å | Al/Zn = 0.14 |
| Ag | 15 | 100 Å | |
| ZnAl overlying barrier | 16 | 12 Å | Al/Zn = 0.14 |
| Central dielectric comprising ZnAlOx | 17 | 800 Å | Al/Zn = 0.14 |
| Ag | 19 | 100 Å | |
| ZnAl overlying barrier | 20 | 18 Å | Al/Zn = 0.14 |
| Top dielectric comprising | | | |
| ZnAlOx | 22 | 180 Å | Al/Zn = 0.14 |
| AlNx | 23 | 85 Å | |

At least a portion of the overlying barriers 16, 20 is oxidised during deposition of their overlying oxide layers. Nevertheless, a portion of these barriers preferably remains in metallic form, or at least in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment see Note 1 below | Following heat treatment see Note 2 below |
|---|---|---|
| TL (Illuminant A) | — | 75.5% |
| TE (System Moon 2) | — | 43.4% |
| haze | — | 0.21 |
| a* | — | — |
| b* | — | — |
| RE (System Moon 2) | — | 31.5% (external) |

Note 1: Measured for monolithic glazing panel with coating prior to heat treatment
Note 2: Measured following heat treatment at 625° C. for 14 minutes with bending and tempering, and lamination with clear 2 mm glass sheet and 0.76 mm clear pvb

EXAMPLES 5

Example 5 is similar to Example 2. The coating stacks and properties of the Example are set out below:

| | Reference number | Geometrical thickness | Atomic ratios |
|---|---|---|---|
| Glass substrate | 10 | 2 mm | |
| Base dielectric Comprising | 11 | | |
| AlNx | 12 | 100 Å | |
| ZnAlOx | 13 | 220 Å | Al/Zn = 0.05 |
| Ag-Pd | 15 | 100 Å | Pd/Ag = 0.005 |
| ZnAl overlying barrier | 16 | 12 Å | Al/Zn = 0.05 |
| Central dielectric Comprising ZnAlOx | 17 | 800 Å | Al/Zn = 0.05 |
| Ag-Pd | 19 | 100 Å | Pd/Ag = 0.005 |
| ZnAl overlying barrier | 20 | 18 Å | Al/Zn = 0.05 |
| Top dielectric comprising | | | |
| ZnAlOx | 22 | 180 Å | Al/Zn = 0.05 |
| AlNx | 23 | 85 Å | |

At least a portion of the overlying barriers 16, 20 is oxidised during deposition of their overlying oxide layers. Nevertheless, a portion of these barriers preferably remains in metallic form, or at least in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment see Note 1 below | Following heat treatment see Note 2 below |
|---|---|---|
| TL (Illuminant A) | — | 75.2% |
| TE (System Moon 2) | — | 42.9% |
| haze | — | 0.24 |
| a* | — | — |
| b* | — | — |
| RE (System Moon 2) | — | 31.4% (external) |

Note 1: Measured for monolithic glazing panel with coating prior to heat treatment
Note 2: Measured following heat treatment at 625° C. for 14 minutes with bending and tempering, and lamination with clear 2 mm glass sheet and 0.76 mm clear pvb Glossary Unless otherwise indicated by the context, the terms listed below have the following meanings in this specification:

| | | |
|---|---|---|
| a* | | colour co-ordinate measured on the CIELab scale at normal incidence |
| Ag | silver | |
| Al | aluminum | |
| Al2O3 | aluminum oxide | |
| AlN | aluminum nitride | |
| b* | | colour co-ordinate measured on the CIELab scale at normal incidence |
| Bi | bismuth | |
| Cr | chromium | |
| haze | | the percentage of transmitted light which in passing through the specimen deviates from the incident beam by forward scattering, as measured in accordance with the ASTM Designation D 1003-61 (Reapproved 1988). |
| Hf | hafnium | |
| infra red reflecting material | | a material that has a reflectance higher than the reflectance of sodalime glass in the band of wavelengths between 780 nm and 50 microns |
| Na | sodium | |
| Nb | niobium | |
| NiCr | | an alloy or mixture comprising nickel and chromium |
| NiTi | | an alloy or mixture comprising nickel and titanium |
| RE | energetic reflection | the solar flux (luminous and non-luminous) reflected from a substrate as a percentage of the incident solar flux |
| Sb | antimony | |
| selectivity | | the ratio of the luminous transmittance to the solar factor i.e. TL/TE |
| SiO2 | silicon oxide | |
| Si3N4 | silicon nitride | |
| SnO2 | tin oxide | |
| Ta | tantalum | |
| TE | energetic transmittance | the solar flux (luminous and non-luminous) transmitted through a substrate as a percentage of the incident solar flux |
| Ti | titanium | |
| TL | luminous transmittance | the luminous flux transmitted through a substrate as a percentage of the incident luminous flux |
| Zn | zinc | |
| ZnAl | | an alloy or mixture comprising zinc and aluminum |
| ZnAlOx | | a mixed oxide containing zinc and aluminum |
| ZnAlOy | | a partially oxidised mixture comprising zinc and aluminum |
| ZnO | zinc oxide | |
| ZnTi | | an alloy or mixture comprising zinc and titanium |
| ZnTiOx | | a mixed oxide containing zinc and titanium |
| ZnTiOy | | a partially oxidised mixture comprising zinc and titanium |
| Zr | zirconium | |

What is claimed is:

1. A glazing panel, comprising in sequence at least:
   a glass substrate,
   a base antireflective layer comprising at least one layer comprising aluminum nitride,
   an infra-red reflecting layer, and
   a top antireflective layer,
      wherein a heat treatment of said glazing panel causes an increase of the value of $T_L$ of the glazing panel of at least 2.5%.

2. The panel in accordance with claim 1 comprising in sequence at least:
   said glass substrate,
   said base antireflective layer,
   said infra-red reflecting layer,
   a central antireflective layer,
   said infra-red reflecting layer; and
   said top antireflective layer.

3. The panel in accordance with claim 1, in which the at least one layer comprising a nitride of aluminum has a geometrical thickness greater than 40 Å.

4. The panel in accordance with claim 1, in which the at least one layer comprising a nitride of aluminum has a geometrical thickness less than 195 Å.

5. The panel in accordance with claim 1, in which the base antireflective layer and the top antireflective layer each comprises at least one layer comprising a nitride of aluminum.

6. The panel in accordance with claim 1, in which each antireflective layer comprises at least one layer comprising a nitride of aluminum.

7. The panel in accordance with claim 1, in which the base antireflective layer comprises a first layer adjacent to the substrate comprising a nitride of aluminum and an overlying layer comprising a metal oxide.

8. The panel in accordance with claim 7, in which the layer of a metal oxide is a layer of a mixed oxide of zinc and aluminum.

9. The panel in accordance with claim 8, in which the mixed oxide of zinc and aluminum has an atomic ratio Al/Zn of greater than or equal to 0.05 and less than or equal to 0.25.

10. The panel in accordance with claim 1, in which the top antireflective layer comprises a first layer of a metal oxide and an overlying layer comprising a nitride of aluminum.

11. A method of manufacturing a glazing panel having a haze of less than about 0.5 comprising the step of subjecting the glazing panel as claimed in claim 1 to a heat treatment process of at least 570° C.

12. The panel as claimed in claim 1, wherein said heat treatment causes an increase of the value of $T_L$ of the glazing panel of at least 5%.

13. The panel as claimed in claim 1, wherein said aluminum nitride is substantially pure AlN.

14. The panel as claimed in claim 1, wherein said aluminum nitride contains about 97% AlN by weight.

15. A glazing panel, comprising in sequence at least:
a glass substrate,
a base antireflective layer,
an infra-red reflecting layer, and
a top antireflective layer,
characterized in that the top antireflective layer comprises at least one layer comprising a nitride of aluminum having a geometrical thickness of less than 100 Å;
and wherein a heat treatment of said glazing panel causes an increase of the value of $T_L$ of the glazing panel of at least 5%.

16. The panel as claimed in claim 15, wherein said nitride of aluminum is substantially pure AlN.

17. The panel as claimed in claim 15, wherein said nitride of aluminum contains about 97% AlN by weight.

18. The panel as claimed in claim 15, wherein said base antireflective layer comprises at least one layer comprising aluminum nitride.

19. The panel as claimed in claim 15, wherein said top antireflective layer comprises a first layer of a metal oxide and an overlying layer comprising aluminum nitride.

20. The panel as claimed in claim 19, wherein said layer of a metal oxide is a layer of a mixed oxide of zinc and aluminum.

21. The panel as claimed in claim 20, wherein said layer of a metal oxide comprises an atomic ratio of Al/Zn of greater than or equal to 0.05 and less than or equal to 0.25.

22. A method of manufacturing a glazing panel having a haze of less than about 0.5 comprising the step of subjecting the glazing panel as claimed in claim 15 to a heat treatment process of at least 570° C.

23. A glazing panel comprising in sequence at least:
a glass substrate,
a base antireflective layer,
an infra-red reflecting layer, and
a top antireflective layer,
characterized in that the top antireflective layer comprises at least one layer comprising a nitride of aluminum having a geometrical thickness of less than 100 Å;
and wherein a heat treatment of said glazing panel causes an increase of the value of $T_L$ of the glazing panel of at least 2.5%.

24. The panel as claimed in claim 23, wherein said base antireflective layer comprises at least one layer comprising aluminum nitride.

25. The panel as claimed in claim 23, wherein said top antireflective layer comprises a first layer of a metal oxide and an overlying layer comprising aluminum nitride.

26. The panel as claimed in claim 25, wherein said layer of a metal oxide is a layer of a mixed oxide of zinc and aluminum.

27. The panel as claimed in claim 26, wherein said layer of a metal oxide comprises an atomic ratio of Al/Zn of greater than or equal to 0.05 and less than or equal to 0.25.

28. The panel as claimed in claim 23, wherein said nitride of aluminum is substantially pure AlN.

29. The panel as claimed in claim 23, wherein said nitride of aluminum contains about 97% AlN by weight.

30. A method of manufacturing a glazing panel having a haze of less than about 0.5 comprising the step of subjecting the glazing panel as claimed in claim 23 to a heat treatment process of at least 570° C.

31. A substantially haze free heat treated glazing panel, comprising in sequence at least:
a glass substrate,
a base antireflective layer comprising at least one layer comprising aluminum nitride,
an infra-red reflecting layer, and
a top antireflective layer,
wherein said heat treated glazing panel is formed by heat treating a heat treatable glazing panel and wherein the heat treating causes an increase of the value of $T_L$ of the heat treatable glazing panel of at least 2.5%.

32. The panel in accordance with claim 31, comprising in sequence at least:
said glass substrate,
said base antireflective layer,
said infra-red reflecting layer,
a central antireflective layer,
said infra-red reflecting layer; and
a top antireflective layer.

33. The panel in accordance with claim 31, in which the at least one layer comprising a nitride of aluminum has a geometrical thickness greater than 40 Å.

34. The panel in accordance with claim 31, in which the at least one layer comprising a nitride of aluminum has a geometrical thickness less than 195 Å.

35. The panel in accordance with claim 31, in which the base antireflective layer and the top antireflective layer each comprises at least one layer comprising a nitride of aluminum.

36. The panel in accordance with claim 31, in which each antireflective layer comprises at least one layer comprising a nitride of aluminum.

37. The panel in accordance with claim 31, in which the base antireflective layer comprises a first layer adjacent to the substrate comprising a nitride of aluminum and an overlying layer comprising a metal oxide.

38. The panel in accordance with claim 37, in which the layer of a metal oxide is a layer of a mixed oxide of zinc and aluminum.

39. The panel in accordance with claim 38, in which the mixed oxide of zinc and aluminum has an atomic ratio Al/Zn of greater than or equal to 0.05 and less than or equal to 0.25.

40. The panel in accordance with claim 31, in which the top antireflective layer comprises a first layer of a metal oxide and an overlying layer comprising a nitride of aluminum.

41. A method of manufacturing the panel as claimed in claim 31, said panel having a haze of less than about 0.5, comprising subjecting the heat treatable glazing panel to a heat treatment process of at least 570° C.

42. The panel as claimed in claim 31, comprising a haze of less than about 0.5.

43. The panel as claimed in claim 31, wherein said heat treating causes an increase of the value of $T_L$ of the heat treatable glazing panel of at least 5%.

44. The panel as claimed in claim 31, wherein said heat treating is carried out at a temperature of at least 570° C.

45. The panel as claimed in claim 31, wherein said aluminum nitride is substantially pure AlN.

46. The panel as claimed in claim 31, wherein said aluminum nitride contains about 97% AlN by weight.

47. A substantially haze free heat treated glazing panel, comprising in sequence at least:
a glass substrate,
a base antireflective layer,
an infra-red reflecting layer, and
a top antireflective layer,
characterized in that the top antireflective layer comprises at least one layer comprising a nitride of aluminum having a geometrical thickness of less than 100 Å;

and wherein said substantially haze free heat treated panel is produced by heat treating a heat treatable glazing panel, and wherein the heat treating causes an increase of the value of $T_L$ of the heat treatable glazing panel of at least 5%.

48. The panel as claimed in claim 47, comprising a haze of less than about 0.5.

49. The panel as claimed in claim 47, wherein said heat treating is carried out at a temperature of at least 570° C.

50. The panel as claimed in claim 47, wherein said base antireflective layer comprises at least one layer comprising aluminum nitride.

51. The panel as claimed in claim 47, wherein said top antireflective layer comprises a first layer of a metal oxide and an overlying layer comprising aluminum nitride.

52. The panel as claimed in claim 51, wherein said layer of a metal oxide is a layer of a mixed oxide of zinc and aluminum.

53. The panel as claimed in claim 52, wherein said layer of a metal oxide comprises an atomic ratio of Al/Zn of greater than or equal to 0.05 and less than or equal to 0.25.

54. The panel as claimed in claim 47, wherein said nitride of aluminum is substantially pure AlN.

55. The panel as claimed in claim 47, wherein said nitride of aluminum contains about 97% AlN by weight.

56. A method of manufacturing the panel as claimed in claim 47, said panel having a haze of less than about 0.5, comprising subjecting the heat treatable glazing panel to a heat treatment process of at least 570° C.

57. A substantially haze free heat treated glazing panel comprising in sequence at least:

a glass substrate, a base antireflective layer, an infra-red reflecting layer, and a top antireflective layer, characterized in that the top antireflective layer comprises at least one layer comprising a nitride of aluminum having a geometrical thickness of less than 100 Å;

wherein said substantially haze free heat treated glazing panel is produced by heat treating a heat treatable glazing panel, and wherein the heat treating causes an increase of the value of $T_L$ of the heat treatable glazing panel of at least 2.5%.

58. The panel as claimed in claim 57, comprising a haze of less than about 0.5.

59. The panel as claimed in claim 57, wherein said heat treating is carried out at a temperature of at least 570° C.

60. The panel as claimed in claim 57, wherein said base antireflective layer comprises at least one layer comprising aluminum nitride.

61. The panel as claimed in claim 57, wherein said top antireflective layer comprises a first layer of a metal oxide and an overlying layer comprising aluminum nitride.

62. The panel as claimed in claim 61, wherein said layer of a metal oxide is a layer of a mixed oxide of zinc and aluminum.

63. The panel as claimed in claim 62, wherein said layer of a metal oxide comprises an atomic ratio of Al/Zn of greater than or equal to 0.05 and less than or equal to 0.25.

64. The panel as claimed in claim 57, wherein said nitride of aluminum is substantially pure AlN.

65. The panel as claimed in claim 57, wherein said nitride of aluminum contains about 97% AlN by weight.

66. A method of manufacturing the panel as claimed in claim 57, said panel having a haze of less than about 0.5, comprising subjecting the heat treatable glazing panel to a heat treatment process of at least 570° C.

* * * * *